(12) United States Patent
Sun et al.

(10) Patent No.: US 10,282,206 B1
(45) Date of Patent: May 7, 2019

(54) ALIAS REGISTER FILE FOR SUPPORTING MIXED WIDTH DATAPATH IN A CONFIGURABLE PROCESSOR

(71) Applicant: Cadence Design Systems, Inc., San Jose, CA (US)

(72) Inventors: Fei Sun, San Jose, CA (US); Tiansi Hu, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 39 days.

(21) Appl. No.: 15/596,942

(22) Filed: May 16, 2017

(51) Int. Cl.
 *G06F 9/30* (2018.01)
(52) U.S. Cl.
 CPC ...... *G06F 9/30141* (2013.01); *G06F 9/30098* (2013.01)
(58) Field of Classification Search
 CPC .................. G06F 9/30141; G06F 9/30098
 See application file for complete search history.

(56) References Cited

U.S. PATENT DOCUMENTS

| | | | |
|---|---|---|---|
| 5,437,043 A * | 7/1995 | Fujii | G06F 9/30112 712/1 |
| 6,477,697 B1 | 11/2002 | Killian et al. | |
| 6,839,828 B2 * | 1/2005 | Gschwind | G06F 9/30043 712/20 |
| 7,346,881 B2 | 3/2008 | Wang et al. | |
| 7,774,768 B2 * | 8/2010 | Warnes | G06F 9/30156 717/149 |
| 8,458,677 B2 * | 6/2013 | Gschwind | G06F 8/447 717/106 |
| 8,935,468 B2 | 1/2015 | Maydan et al. | |
| 9,250,900 B1 | 2/2016 | Kim et al. | |
| 9,448,801 B2 | 9/2016 | Sun | |
| 9,477,473 B2 | 10/2016 | Sun | |
| 2008/0313424 A1 * | 12/2008 | Gschwind | G06F 9/30036 712/23 |
| 2009/0106527 A1 * | 4/2009 | Luick | G06F 9/30032 712/7 |
| 2009/0198966 A1 * | 8/2009 | Gschwind | G06F 9/30036 712/208 |
| 2013/0103932 A1 * | 4/2013 | Gschwind | G06F 9/30025 712/222 |
| 2016/0299998 A1 * | 10/2016 | Isshiki | G06F 17/505 |

* cited by examiner

*Primary Examiner* — Stacy Whitmore
(74) *Attorney, Agent, or Firm* — Foley & Lardner LLP

(57) ABSTRACT

According to certain general aspects, the present embodiments allow register files and states with different data types to share logic area while minimizing unnecessary use of power in a configurable processor. Embodiments include allowing configurable processor designers to describe alias register files and states. Using alias register files and states, designers can implement vector and scalar operations on different register files, but the scalar register file can be implemented on the vector register file. In addition, the upper lanes of the vector register file can be clock gated when the scalar operation performs computations. With this gating, the clocks for the entire upper lanes (including the register file, state, semantic, mux, decoder) can be disabled, which provides power savings.

17 Claims, 7 Drawing Sheets

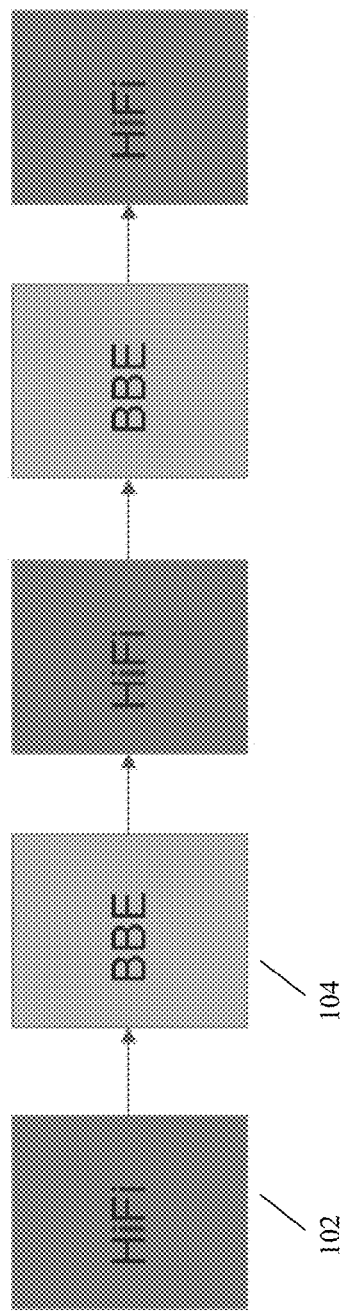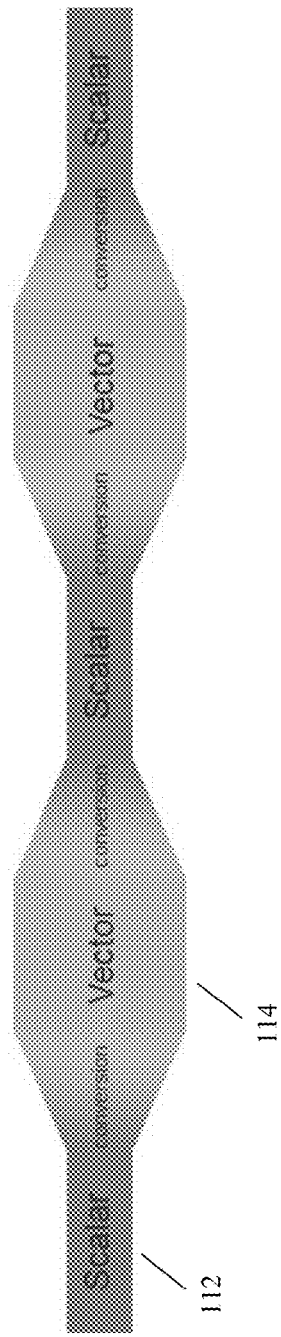
FIG. 1A
FIG. 1B

ALIAS REGISTER FILE FOR SUPPORTING MIXED WIDTH DATAPATH IN A CONFIGURABLE PROCESSOR

TECHNICAL FIELD

The present embodiments relate generally to microprocessors, and more particularly to techniques for providing a mixed width datapath and clock gating in a configurable processor.

BACKGROUND

Integrated circuit (IC) design tools currently exist that allow a designer to easily configure a configurable processor core with desired functionality, such as whether to include floating point hardware. Such configurable processor cores can include a base instruction set architecture (ISA), and these and other design tools can further allow a designer to extend this base ISA with instruction extensions, based on desired applications for the IC for example. These design tools can then automatically generate a description of circuitry necessary to implement the configured processor and base and extended instruction sets. These design tools can further automatically generate all the necessary tools such as compiler, assembler, debugger and simulator, that allow developers to develop applications for the designed processor and to verify the processor and applications.

Certain power and area inefficiencies can arise when designing such configurable processors, including when different instruction extensions reference separate but similar data structures. Opportunities exist, therefore, for addressing such efficiencies, among other potential issues.

SUMMARY

According to certain general aspects, the present embodiments allow register files and states with different data types to share logic area while minimizing unnecessary use of power in a configurable processor. Embodiments include allowing configurable processor designers to describe alias register files and states. Using alias register files and states, designers can implement vector and scalar operations on different register files, but the scalar register file can be implemented on the vector register file. In addition, the upper lanes of the vector register file can be clock gated when the scalar operation performs computations. With this gating, the clocks for the entire upper lanes (including the register file, state, semantic, mux, decoder) can be disabled, which provides power savings.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein:

FIGS. 1A and 1B are diagrams illustrating aspects of different applications executed by different instruction extensions in a configurable processor;

DETAILED DESCRIPTION OF THE PREFERRED EMBODIMENTS

Figure 2:
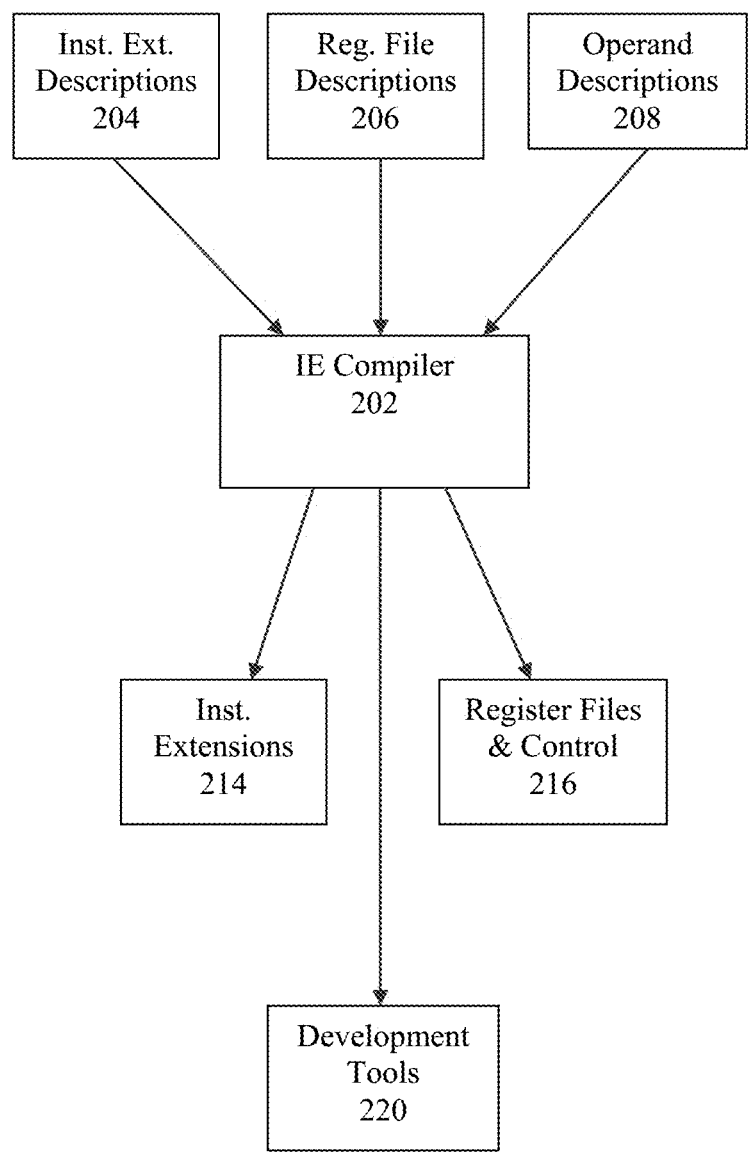
FIG. 2 is a block diagram illustrating aspects of describing and generating alias register files and states according to embodiments.

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

According to certain aspects, the present applicant recognizes certain inefficiencies that conventional configurable processor design tools do not adequately address. One problem recognized by the present applicant is that one processor configuration may contain multiple independently developed custom instruction extensions with register files and states. Their use models are usually interleaved. The computation blocks are unique in each extension and cannot be shared. However, the storage elements that they access (e.g., register files/states) can be shared. But the fact that the instruction extensions that use them are independently developed (e.g., by a third party) can prevent sharing.

As shown in FIG. 1A, a single processor configuration can include multiple custom instruction extensions, each accelerating their applications in a vertical domain. For example, HiFi extension 102 speeds up applications in the audio domain, while BBE extension 104 speeds up applications in the base band domain. These extensions perform very different tasks and they are usually developed independently. Design choices are made to improve the area/power/performance of the target extension alone. Designers may use the same methodology to develop multiple custom instruction extensions for different purposes. One processor configuration, may thus contain multiple custom instruction extensions, and the extensions may be used intermittently in an application, as shown in FIG. 1A, for example HiFi extension 102 at one point in time and BBE extension 104 at another point in time. The granularity of each block can vary from tens of cycles to millions of cycles.

However, when HiFi extension 102 is active in the processor, BBE extension 104 is idle, and vice versa. The computation blocks (e.g., semantics) of each extension are unique and cannot be shared. The temporary storage units in the extensions (e.g., register files and states) usually have similar structures. Having two copies of the storage units in the processor and only activating half of them is a waste of area and power.

Another problem recognized by the present applicant is that if the different extensions have different datapath widths, even if they do share storage elements, the power usage may not be ideal because the extension with the narrow width may use the wide width storage elements, which can lead to inefficiencies.

More particularly, as shown in FIG. 1B, the design of a wide SIMD custom instruction usually contains register files and/or states that can hold the entire SIMD data. The design usually also contains custom instructions working on the scalar data type that only utilizes one SIMD lane. For example, a SIMD of 32×8 means each data element size is 32 bits, and 8 elements can be processed at one time, totaling 512 bits. The operations working on the scalar data type only need to process 32 bits of data. One application may process data in scalar data type 112 for some time, then switch to processing the wide SIMD datatype 114 and then switch back, etc., as shown in FIG. 1B.

Designers may use two separate register files, one for the vector SIMD data type and one for the scalar data type. However, using two register files may not be ideal as utilization of each register file is reduced. Also, application writers need to handle separate data types and manage the data movement semi-manually. But moving data between the register files wastes cycles.

To attempt to solve these problems, designers may configure the vector register file to also hold the scalar data, which is good for area reduction. However, when performing scalar operations, only the lowest SIMD lane contains useful data, while the entire register file becomes active, which wastes power.

Likewise, when multiple independently developed extensions are put to one configuration, the current method is to have separate register files and states for each extension, which is a waste of area/power. If designers extensively rewrite the extensions to share the register files or states from the very beginning (assuming they have access to the source code), the shared register file width is the maximum width of all the shared register files. When the extension with narrow register file is needed, the entire width of the register file is activated, which is a waste of power.

In sum, with conventional approaches such as those described above, designers may not have the source code of the independently developed extensions to modify. And even if they have the source code, extensively modifying the source code requires a huge verification effort. Moreover, even after they have modified the code, they do not have finer grained control of the power consumed when only a narrow width of a shared register file is needed.

According to certain general aspects, the present embodiments solve the above and other problems with no change to the independently developed extensions, and with only minimal additions to existing ways register files are described for use by instruction extensions and inclusion in a target processor configuration.

In embodiments, the additions include the ability to describe alias register files and states. Using alias register files and states, designers can implement vector and scalar operations on different register files, but the scalar register file can be implemented on the vector register file. In addition, the upper lanes of the vector register file can be clock gated when the scalar operation performs computations. With this gating, the clocks for the entire upper lanes (including the register file, state, semantic, mux, decoder) can be disabled, which provides power savings.

With reference to the example of FIGS. 1A and 1B, assume HiFi extension 102 and BBE extension 104 are developed independently, and that HiFi extension's register file is 64 bits, while BBE extension's register file is 512 bits with 8 64-bit SIMD lanes. Using the present embodiments, the HiFi extension's register file can be declared as an alias of the BBE extension's register file. Thus, when HiFi extension 102 code is executing, only the lower 64 bits of the BBE extension 104 register file is active.

According to certain aspects of the embodiments, designers do not need to have access to the independently developed extensions. They only need to know the register file/state that they want to share, and declare the narrower register file/state to be an alias of the wider one. An instruction extension compiler according to the embodiments uses that information to generate the hardware that allows the different extensions to share the register files/ states. In addition, the instruction extension compiler may use that information to generate clock gating hardware and signals that can clock gate an entire SIMD slice or a particular portion of the register file core and the bypass network. As such, a processor configuration according to the embodiments can be made more optimal because it allows logic area to be shared and adds control logic and signals to reduce power for unused portions of a shared register file/state.

FIG. 2 is a functional block diagram illustrating various aspects of the present embodiments.

As shown in FIG. 2, instruction extension (IE) compiler 202 receives instruction extension descriptions 204, register file descriptions 206, and operand descriptions 208. In accordance with certain aspects, instruction extension descriptions 204 include instruction extensions that access different data types, such as vector and scalar data types. Likewise, register file descriptions 206 include descriptions of storage elements for the different data types accessed by instruction extensions described by descriptions 204, such as vector and scalar data. Based on these descriptions, IE compiler 202 generates instruction extensions 214 and register files 216. IE compiler 202 further generates development tools 220 that allow designers to develop applications that use the generated instruction extensions 214 and register files 216. It should be noted that IE compiler 202 can further receive descriptions of states and can further generate components of a processor based on these descriptions. These state descriptions can include alias state descriptions according to embodiments. Although the following descriptions will focus on alias register files and descriptions, those skilled in the art will also be able to implement similar processor functionality and design methodologies for alias states after being taught by the foregoing examples.

In example embodiments, IE compiler 202 can be adapted from the TIE compiler described in U.S. Pat. Nos. 6,477,697 and/or 7,346,881, the contents of which are incorporated by reference herein in their entirety. In these and other embodiments, IE compiler 202 can receive other designer inputs such as processor configurations, and can further generate other processor components and hardware in addition to the instruction extension and register file described by descriptions 204 and 216, respectively. However, further details regarding these other inputs and generated components are omitted here for sake of clarity of the invention. Those skilled in the art will understand how to adapt a compiler described in the referenced patents for use in the present embodiments after being taught by the present examples.

In embodiments, instruction extension descriptions 204 can be complex instruction extension descriptions based on a standardized description language in accordance with the constructs and methodologies described in U.S. Pat. Nos. 6,477,697 and/or 7,346,881. In this example, an instruction extension description language allows a processor designer to describe custom functions for an application in the form of extensions and new instructions to augment the base ISA of the configurable processor. An instruction extension description uses a number of building blocks to delineate the attributes of new instructions such as instruction fields, instruction classes, instruction opcodes, instruction semantics, instruction operands and constant tables. A number of building blocks are further included in the language to make it possible to declare additional processor states which can be read and written by the new instructions.

Instruction extensions 214 and register files 216 are, for example, Hardware Description Language (e.g. Verilog, VHDL, etc.) descriptions of circuitry necessary to implement the designer's desired register files and instruction extensions as described by descriptions 204 and 206, respectively.

Development tools 220 include tools such as a compiler, assembler, debugger and simulator which can be used to develop applications for the processor, including the generated instruction extensions 214 and register files 216, and to verify the processor and applications. According to certain aspects of the present embodiments, these applications do not need to be aware that certain of register files 216 and states accessed by different instruction extensions 214 are implemented using the alias register file and state techniques of the present embodiments. For example, assume that a single configurable processor is simultaneously being independently designed by a team of designers and that a first designer designs a SIMD instruction extension that accesses a vector register file as an operand, as well as a first application that includes a programming instruction and argument that uses that SIMD instruction extension and vector register file, respectively. Meanwhile, a second designer designs a scalar instruction extension that accesses a scalar register file as an operand, as well as a second application that includes a programming instruction and argument that uses that scalar instruction extension and scalar register file, respectively. Either of these first and second designers or a different third designer can thereafter declare the scalar register file to be an alias register file of the vector register file according to the present embodiments as will be explained in more detail below. When a new version of tools 220 is generated by compiler 202, neither of the designed programming instructions in the first and second applications needs to be changed, even though they will now share hardware in the processor supporting their associated instruction extensions and register files.

An example of register file descriptions 206 according to embodiments is set forth in more detail below. In this example, a "base" register file/state construct to the register file/state description to allow one register file to be declared an "alias" register file/state of the "base" register file. An example of the syntax for such description according to embodiments is below:

regfile XR512 {
    width: 512,
    depth: 16,
    short_name: xr,
    num_slices: 16
    }
    regfile XR32 {
    width: 32,
    depth: 16,
    short_name: xr32,
    num_slices: 1,
    base: XR512
    }

In the above example, two register files are declared: XR512, and XR32. The description of register file XR32 has an extra attribute: "base." Without that attribute, XR32 is considered an independent register file. However, when this attribute is added to the description, it means XR32 is implemented using the hardware for the XR512 register file. Thus, XR512 is called a base register file, and XR32 is called an alias register file. It should be noted that the above example description syntax is non-limiting. For example, the "base" attribute for register file XR32 can be declared separately from the other attributes in a separate regfile XR32 { base: XR512 } statement. This allows, for example, independently developed modules to share the same register file.

The following are example characteristics of alias register file descriptions 206 for compiling by an example instruction extension compiler 202 according to embodiments.

Suppose the base register file has <m> entries, width <w0>, number of slices <s0> (i.e. number of individual groups of adjacent bits having width <w0> and associated register file logic), and the alias register file has <n> entries, width <w1>, number of slices <s1>. <m> and <n> are equal. The alias register file occupies the lower <w1> bits of the base register file. Thus <w1><=<w0>. For alias register files, the short_name attribute is optional. If the num_slices of the alias register file is not specified, it defaults to 1. <w0/s0> must be divisible by <w1>/<s1>, or <w1>/<s1> must be divisible by <w0/s0>. <s0> must be multiples of <s1>, or <s1> must be multiples of <s0>. If <s1>><s0>, the value of <s1> is not honored by compiler 202 because it is implemented on the base register file. In one example embodiment of instruction extension compiler 202, alias register files can be referenced in operand, operation, and ctype.

The following is an example of the alias state description according to embodiments:

state st512 {
    width : 512,
    num_slices : 16,
    add_read_write : 1
    }
    state st32 {
    width: 32,
    num_slices : 1,
    add_read_write: 1,
    base: st512
    }

In the above example, two states are declared: st512, and st32. The description of state st32 has an extra attribute: "base." Without that attribute, st32 is considered an independent state. However, when this attribute is added to the description, it means st32 is implemented using the hardware for the st512 state. Thus, st512 is called a base state, and st32 is called an alias state.

The following are example characteristics of alias state descriptions for compiling by an example instruction extension compiler 202 according to embodiments.

Suppose the width of the base state is <w0>, number of slices is <s0>, The width of the alias state is <w1>, number of slices is <s1>. In this example, alias state occupies the lower <w1> bits of the base state. Thus, <w1><=<w0> If the num_slices of the alias state is not specified, it defaults to 1. <w0>/<s0> must be divisible by <w1>/<s1>, or <w1>/<s1> must be divisible by <w0>/<s0>. <s0> must be multiples of <s1>, or <s1> must be multiples of <s0>. If <s1>><s0>, the value of <s1> is not honored because it is implemented on the base state. In one example implementation of compiler 202, alias state can be referenced in operations, iclasses, and semantics.

It should be noted that the identification and description of alias register files/states and their corresponding base register files/states can be done in various ways according to the present embodiments.

For example, different processor design groups can develop relatively independent functionality with instruction extension descriptions 204 (e.g., HiFi and BBE). They can also design separate register file descriptions 206 and states, giving them names that are meaningful in their separate contexts. These developed instruction extensions and register files/states can all be included in one configurable processor description, which thus contains both (all) the developed functionality.

In one possible example, one or more designers can review all of the separately developed descriptions very late in the design cycle and identify register files and states that can be specified as alias and base register files, and rewrite the descriptions 206 (or add a separate description 206 for an existing alias register file description with a new "base" attribute as described above) before being compiled into hardware descriptions by compiler 202. In another example, the identification and rewriting/adding can be done automatically by compiler 202. Those skilled in the art will understand how such automatic identification and rewriting can be done after being taught by the present examples.

In one example embodiment of compiler 202, an alias register file in description 206, and all constructs referencing the alias register file (such as operation, operand, ctype etc.) are written out as if it is an independent register file. In register file port allocation, compiler 202 allocates the operands on the alias register file together with the base register file. Because the scalar operation that uses the alias register file performs the same operation as the vector operation on the lowest lane, designers may desire to implement the scalar operation using the identical logic as the lowest lane of the vector operation. In embodiments, this can be achieved by using the same operand or operation argument names between the scalar and the vector operations. In the semantic, the operation argument name or operand name refer to both the base register file and the alias register file.

Alternatively, according to certain aspects, example embodiments of compiler 202 such as those shown in the example of FIG. 2 include operand descriptions 208 having an "Operand_map" construct. The Operand_map construct update makes it more flexible to implement semantics. IE designers do not need to use the same operation argument name or the operand name in the scalar operations and the vector operations. Different names can be used, as long as their specified semantic argument names are the same in their corresponding operand_map construct.

According to certain aspects, therefore, the operand_map construct can address a problem in which, during IE development, the operations are developed much earlier than the semantics. In addition, the operations and the semantics may be developed by different people or even different groups. While developing the operations, it may be possible that the designers do not have any idea which operations are going to be put in one semantic. However, for efficient development of the semantics, it is ideal to use the same symbol to represent the operation arguments (operands) that fall in the same datapath. This way, there is no need to mux the operation arguments (operands) in the semantic. It saves area and timing.

In order to do this using conventional methodologies, after some decisions are made to put the operations to one semantic, the operation argument (operand) names are changed so that the arguments (operands) in similar datapath use the same name. This destabilizes the operation. It is also quite involved if a designer wants to move some operations from one semantic to another semantic. This process may involve several people and is error prone.

According to certain aspects, the operand_map decouples the symbol used in the semantics from the operation argument names or operand names. This way, the operations can be kept the same, while one semantic symbol can be mapped to multiple operation arguments or operands. It simplifies the development process.

An example syntax of operand description 208 is as follows:

Operandmapdef ::=operand_map operandname operationname operationargname [semanticargname]

Where:

operandname is the name of a previously defined operand, or * if no operand is associated to the operation argument;

operationname is the name of the previously defined operation;

operationargname is an argument name the appeared in the argument list of the operation; and semanticargname is a symbol used in the semantic that is mapped to the operand or operation argument. This optional argument maps the name used in the semantic to the operation argument, or the operand if specified.

An aspect of operand descriptions 208 using an operand_map construct according to embodiments is that none of the downstream tools 220 need to understand it. IE compiler 202 merges the operands/operation arguments into one before passing information to the tools 220.

Example aspects of how IE compiler uses descriptions 204, 206, 208 to generate hardware components (e.g. hardware description language descriptions of such hardware) comprising register files 216 according to embodiments will now be described.

When an alias register file is described in description 206 as being contained in a slice of the base register file, the alias register file occupies the lowest bits of the base register file. In the example shown in FIG. 3, the base register file is the vector register file 302, which has eight entries and each entry occupies 128 bits. The alias register file is the scalar register file 304, which has eight entries, each occupies 32 bits.

Figure 3:
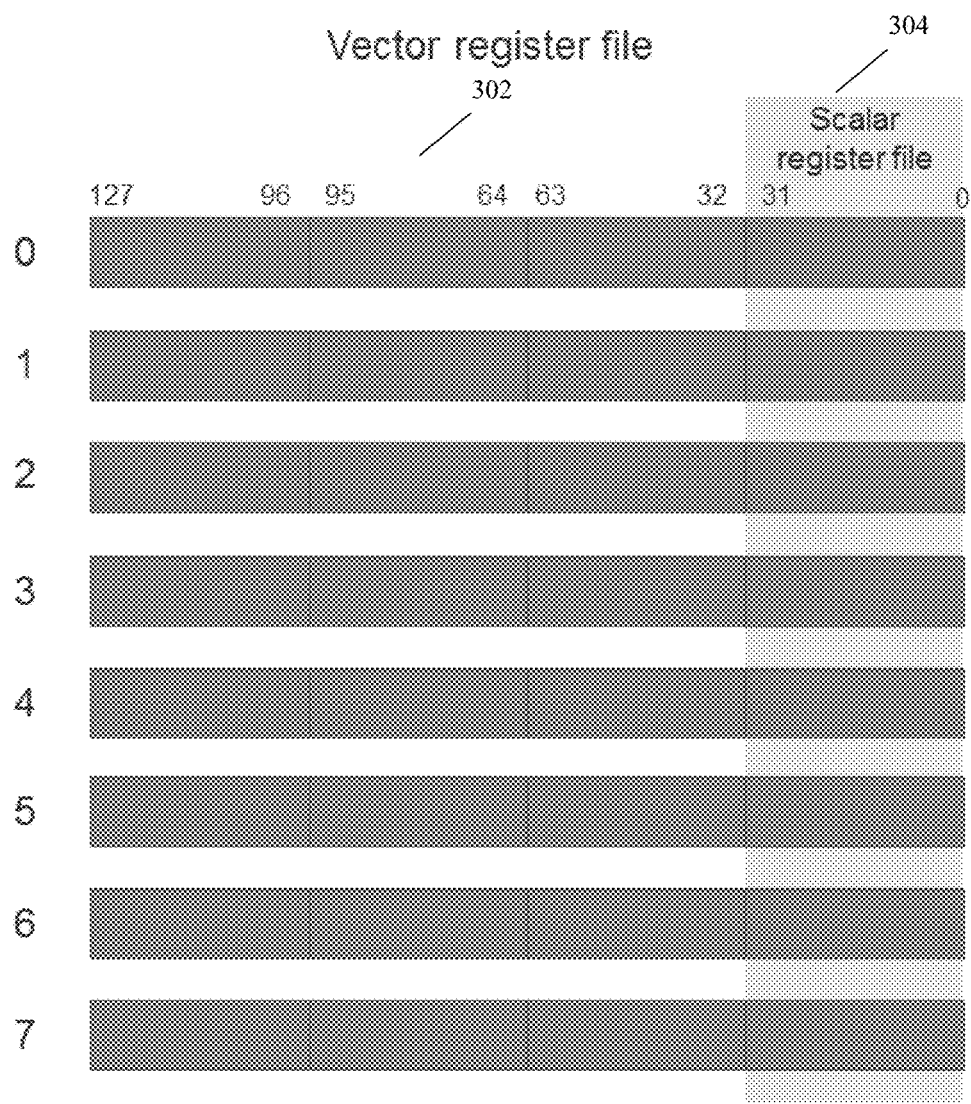
FIG. 3 is a block diagram illustrating aspects of a structure of an example vector register file and scalar register file according to embodiments.

In embodiments, a register file 216 not only includes the register file data structure as shown in FIG. 3, but also includes associated components such as a bypass network, decoding logic and control logic. Diagrams closer to the actual hardware implementation of example embodiments of alias and base register files are shown in FIGS. 4A and 4B.

Figure 4A:
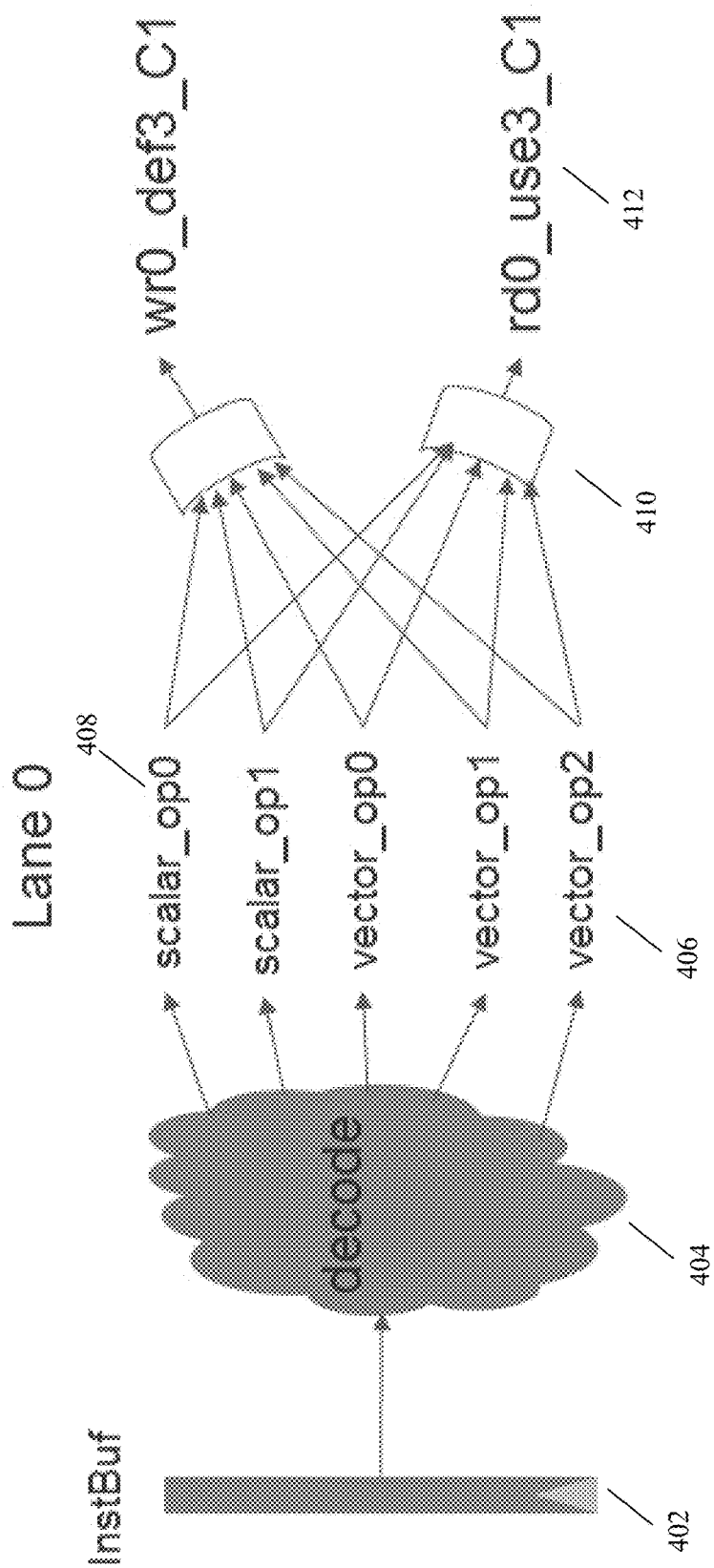
FIGS. 4A and 4B are block diagrams illustrating example aspects of a mixed datapath according to embodiments.
Figure 4B:
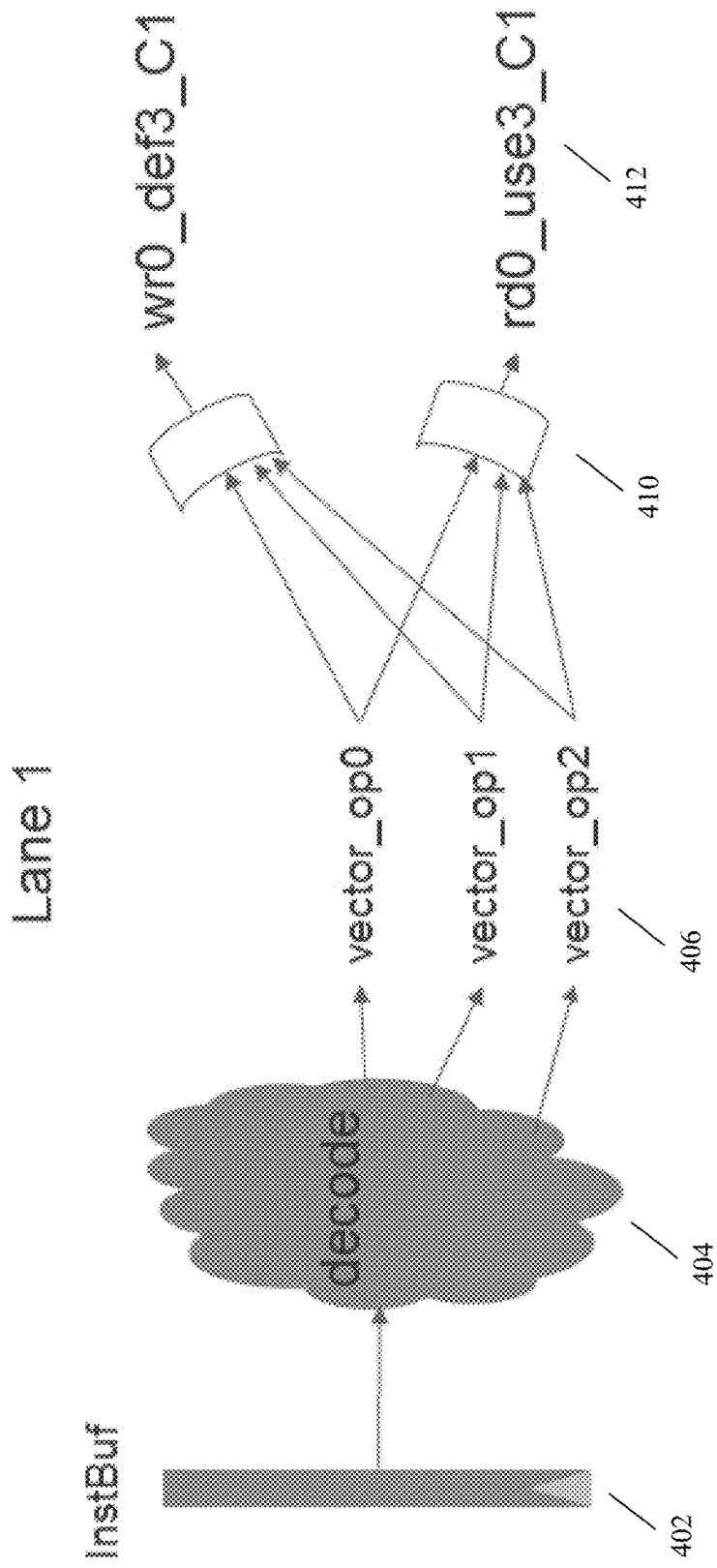

As shown in FIGS. 4A and 4B, a register file datapath for a register file generated by compiler 202 includes logic for generating control signals for the register file read and write ports for instructions accessing the register file. In general, as shown, instructions from an instruction buffer 402 are decoded by decode logic 404, which generates opcodes 406 and 408.

With the register file attribute num_slices, the vector register file datapath can be sliced to multiple lanes. However, in embodiments, the logic created by compiler 202 for generating the control signals 412 are not the same between lanes. The control signals in these examples are: <port_name>_use<stage>_C<decode_stage> for read ports and <port_name>_def<stage>_C<decode_stage> for write ports. Those control signals 412 are generated by the opcodes of the operations that read or write the port in the corresponding stage.

In the example shown in FIG. 4A, a scalar instruction extension has been defined (e.g. one of descriptions 204) with operations having opcodes scalar_op0 and scalar_op1 for reading and writing an alias register file that has been defined (e.g. one of descriptions 206) on top of a vector register file. Also, a vector instruction extension has been defined (e.g. another one of descriptions 204) with operations having opcodes vector_op0, vector_op1 and vector_op2 for reading and writing the vector register file (e.g. another one of descriptions 206).

As shown in FIG. 4A, when the alias register file is used, in the lowest lane, the opcodes of the scalar operations 408 that access the alias register file are added in the control signals of the vector register file. In the upper lanes that are beyond the width of the alias register file, the control signals no longer include the opcodes of the operations that access the alias register file, as shown in the following figure FIG. 4B, which shows an example lane 1 of the corresponding vector register file shown in FIG. 4A.

As set forth above, in addition to adding hardware support for mixed datapaths for alias register files, embodiments of compiler 202 also add hardware support for allowing power to be saved when one or more lanes of an alias register file are being used, while other lanes of an associated base register file are not being used.

Figure 5:
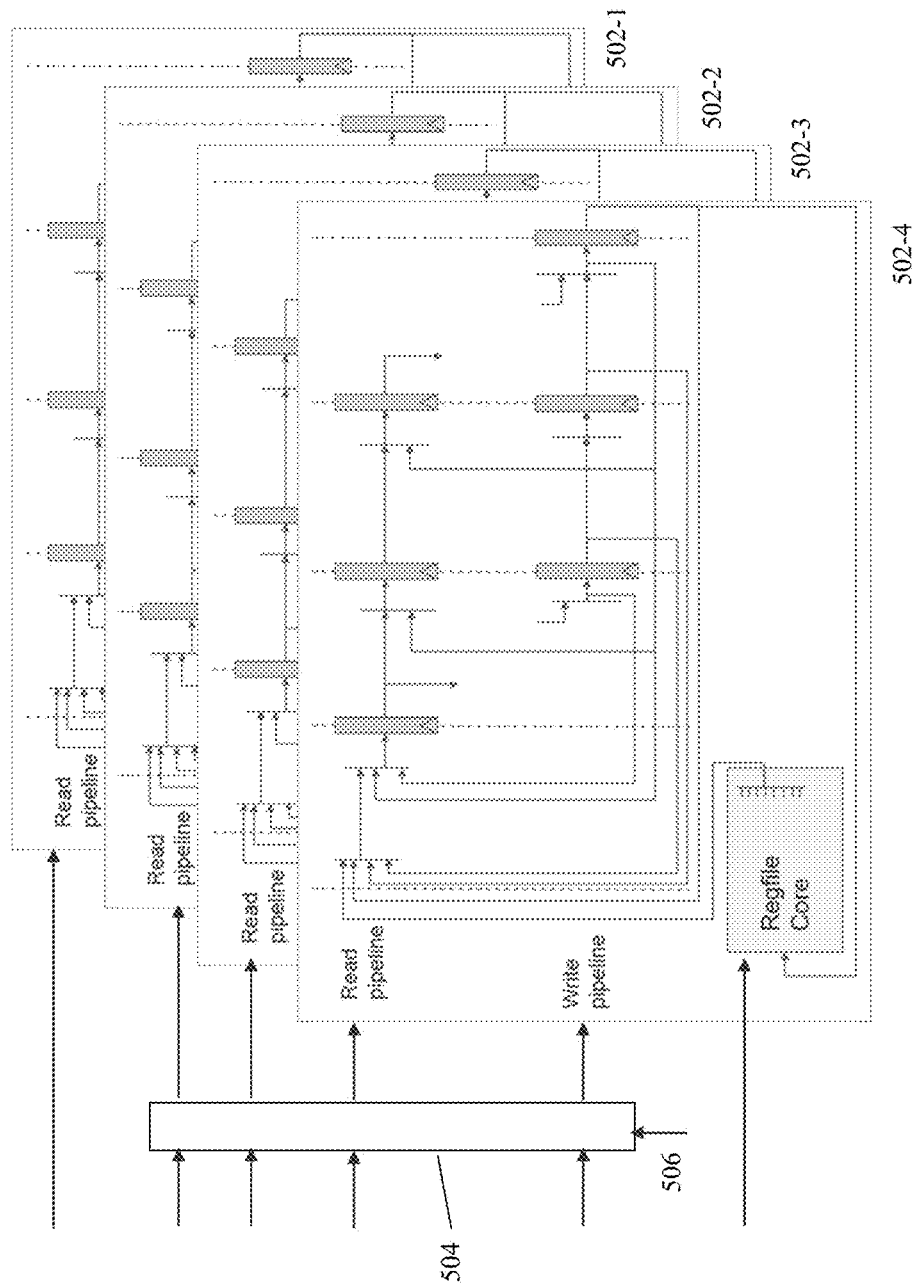
FIG. 5 is a block diagram illustrating an example clock gating of register file lanes according to embodiments.

FIG. 5 shows an example vector register file that is a base file according to embodiments and has four slices 502-1, 502-2, 502-3 and 502-4. Each slice includes a register file core and read and write pipelines. In this example, the lowest slice 502-1 is also being used as the alias register file according to embodiments.

As shown in FIG. 5, a clock gate 504 is included that allows the read/write pipeline clocks for the upper slices 502-2, 502-3 and 504-4 to be enabled and disabled through the use of a control signal 506. As is also shown for the example of upper slice 504-4, the clock for the regfile core is never disabled. It is because the core may be written in multiple stages. Although not shown in FIG. 5, the clocks for write enable pipeline and def pipeline can also be disabled. It should be noted that the example clock gate 504 of FIG. 5 is not limiting, and that there can be separate clock gates 504 and separate control signals 506 for each individual slice.

In embodiments, compiler 202 further generates hardware support for causing the control signal 506 for gate 504 to be generated to save power. In general, this includes identifying instructions that read/write slices 502-2, 502-3 and/or 502-4 of the corresponding register file from instructions that read/write only slice 502-1 (e.g. instructions that are non-sliced) of the corresponding base register file.

For example, in one cycle, if no operation in a bundle of instructions reads/writes any resource in the slices, i.e. all operations are in the non-sliced portion, and all resources they access are in the non-sliced portion, no clock signals are enabled in that cycle.

As another example, in one cycle, if the operations in a bundle of instructions only read/write resources in the non-sliced portion or the alias register file (scalar register file), only the slice(s) that contain the scalar register file are clocked, and the clocks for the rest of the slices are disabled in that cycle by disabling clock enable control signal 506 for gate 504.

As another example, in one cycle, if any operation in a bundle of instructions reads/writes resources in the vector register file/state, the clocks for all slices are enabled by enabling clock enable control signal 506 in that cycle.

In these and other examples, compiler 202 verifies that if an instruction only reads/writes the scalar register file or a non-sliced register file/state, the output only depends on the lower slice. This can be achieved by specifying the alias register file in the operation arguments or instruction class operands, and analyzing the post-optimization DFG that contains that instruction. The output of the module node should have all upper slices to have value X (don't care).

Moreover, to support the above and other examples of enabling or disabling clock signal 506, compiler 202 can cause descriptions of additional logic to be generated in a processor containing base and alias register files according to the embodiments. For example, in some processors having vector register files, logic is included for simultaneously processing bundles of several instructions that are due to be executed by the processor during operation of the processor. In operation of these example processors, there are multiple slots in a bundle, with each slot containing either an instruction to be executed or a NOP, and logic is included to decode the bundles and see what instructions are included in the bundle. In the present embodiments, compiler 202 generates logic for performing instruction decoding of the instructions in the bundle for each slice of a vector register file, and if any instruction in the bundle uses a slice, enabling the clocks for that slice. Otherwise, clocks for the slice are disabled.

Figure 6:
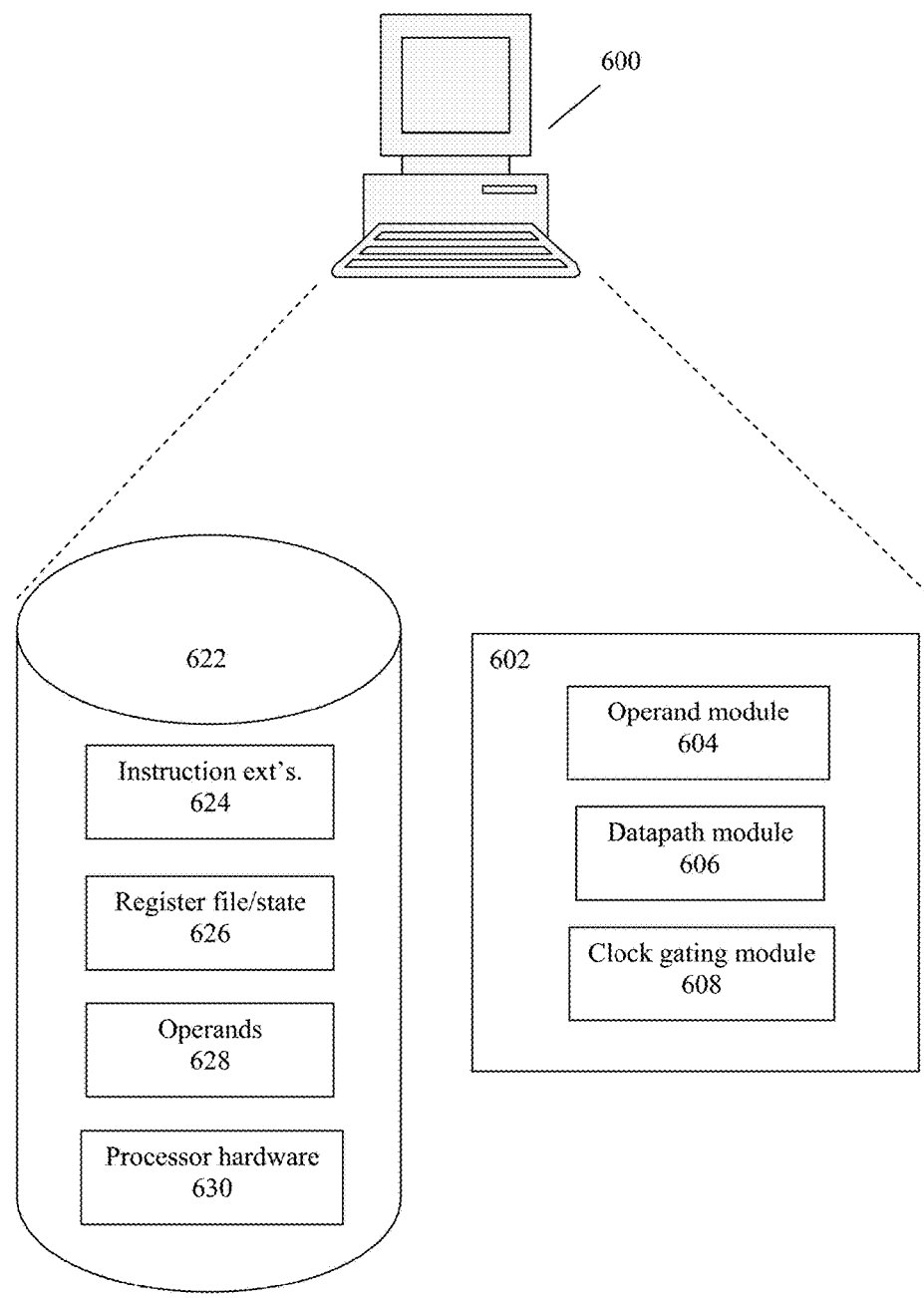
FIG. 6 is a block diagram illustrating an example system according to embodiments.

FIG. 6 is a functional block diagram of an example system for developing a configurable processor having register files with mixed width datapaths according to the present embodiments.

In embodiments, the system 600 can be one or more general purpose computers that are loaded with software (e.g., EDA tools) and/or customized to include hardware for interactively and/or automatically implementing designs of integrated circuits (e.g., ASICs, SOCs, etc.) containing configurable processor cores. In some embodiments, the one or more computing systems 600 comprise various components not shown such as processor(s) or processor core(s), memory, disks, etc.

The one or more computing systems 600 may further write to and read from a local or remote volatile or non-volatile computer accessible storage 622 that stores thereon data or information such as, but not limited to, instruction extension descriptions 624, register file/state descriptions 626, operand descriptions 628 and processor hardware descriptions 630. Descriptions 624, 626, 628 can comprise human-readable text files written in a standardized description language, in one non-limiting example. Hardware descriptions 630 may be in a standard hardware description language format (e.g. Verilog, VHDL, etc.).

In some embodiments, the one or more computing systems 600 are implemented in a "cloud" configuration and/or a client/server configuration. For example, one or more server computers may be loaded with application software (e.g., configurable processor development stystem) for implementing some or all of the methodology of the present embodiments, and one or more client computers can communicate with the server computer(s) via a network to perform some or all of the methodology of the embodiments for a particular design.

In some embodiments, the one or more computing systems 600 may, by various standalone software, hardware modules or combinations thereof 602 (e.g., configurable processor generator and/or instruction extension compiler), include an operand module 604 that uses operand descriptions 628 to resolve operands of various instructions that commonly refer to the same alias and base register files, mixed datapath module 606 that uses instruction extension descriptions 624 and register file/state descriptions 626 for generating hardware descriptions of datapaths for alias and base register files such as those described above in connection with FIGS. 4A and 4B, and clock gating module 608 that uses instruction extension descriptions 624 and register file/state descriptions 626 for generating hardware descriptions of clock gating functionality for alias and base register files such as that described above in connection with FIG. 5. It should be noted that any or all of modules 604, 606 and 608 may be implemented by adapting or communicating with certain pre-existing modules (e.g., instruction extension compiler, configurable processor generator, the systems described in U.S. Pat. Nos. 6,477,697 and/or 7,346,881, other EDA tools, etc.) as may be required to implement a methodology to develop and generate IC designs including processors having alias register files/states according to the present embodiments and as described above. Those skilled in the art will be able to understand how to implement various examples of such modules after being taught by the present disclosure.

Although the present embodiments have been particularly described with reference to preferred ones thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. A method of implementing an integrated circuit, comprising:
   identifying a first description of a vector register file for the integrated circuit;
   identifying a second description of a scalar register file for the integrated circuit; and
   causing the scalar register file to be implemented in hardware using a portion of the vector register file in the integrated circuit,
   wherein the first description specifies a plurality of slices for the vector register file, and wherein causing the scalar register file to be implemented using the portion of the vector register file includes implementing the scalar register file using certain of the slices for the vector register file, and
   wherein causing the scalar register file to be implemented using the portion of the vector register file includes adding logic in the integrated circuit that disables clocks to other of the certain slices of the vector register file.

2. The method of claim 1, further comprising:
   identifying a third description of the scalar register file that refers to the vector register file, wherein causing the scalar register file to be implemented using the portion of the vector register file is performed based on the identified third description.

3. The method of claim 2, wherein the third description is included in the second description.

4. The method of claim 2, wherein the third description is separate from the second description.

5. The method of claim 1, wherein the certain slices comprise a single lowest slice of the vector register file.

6. The method of claim 1, wherein each of the plurality of slices comprises the same number of bits.

7. The method of claim 1, wherein adding logic includes adding logic that identifies when instructions that refer to the other slices of the vector register file are to be executed.

8. The method of claim 1, further comprising:
   identifying a third description of a vector instruction that references the vector register file;
   identifying a fourth description of a scalar instruction that references the scalar register file; and
   causing a narrow datapath for the scalar instruction to be implemented using a portion of a wide datapath for the vector instruction in the integrated circuit based on the identified first and second instructions.

9. The method of claim 8, wherein the third description specifies a plurality of lanes in the wide datapath, and wherein causing the narrow datapath for the scalar instruction to be implemented using the portion of the wide datapath for the vector instruction in the integrated circuit includes implementing the narrow datapath using certain of the lanes in the wide datapath.

10. The method of claim 9, wherein the certain lanes comprise a single lowest lane of the wide datapath.

11. A method of implementing an integrated circuit, comprising:
    identifying a first description of a vector state for the integrated circuit;
    identifying a second description of a scalar state for the integrated circuit; and
    causing the scalar state to be implemented in hardware using a portion of the vector state in the integrated circuit,
    wherein the first description specifies a plurality of slices for the vector state, and wherein causing the scalar state to be implemented using the portion of the vector state includes implementing the scalar state using certain of the slices for the state, and
    wherein causing the scalar state to be implemented using the portion of the vector State includes adding logic in the integrated circuit that disables clocks to other of the certain slices of the vector state.

12. The method of claim 11, further comprising:
    identifying a third description of the scalar state that refers to the vector state, wherein causing the scalar state to be implemented using the portion of the vector state is performed based on the identified third description.

13. The method of claim 12, wherein the third description is included in the second description.

14. The method of claim 12, wherein the third description is separate from the second description.

15. A method of implementing an integrated circuit, comprising:
    identifying a vector instruction that refers to a vector register file of the integrated circuit;

identifying a scalar instruction that refers to a scalar register file of the integrated circuit;

causing the scalar register file to be implemented in hardware using a portion of the vector register file in the integrated circuit without any changes to the vector instruction and the scalar instruction; and identifying an operand map that specifies a mapping between operands associated with the vector instruction and the scalar instruction, and wherein causing the scalar register file to be implemented using a portion of the vector register file without any changes to the vector instruction and the scalar instruction includes using the identifying operand map.

16. The method of claim 15, wherein one or both of the vector and scalar instructions are included in an application for execution by a processor of the integrated circuit.

17. The method of claim 16, wherein the processor is a configurable processor, and wherein the one or both of the vector and scalar instructions refer to instruction extensions designed for the configurable processor.

* * * * *